United States Patent [19]
Scheiber

[11] Patent Number: 5,307,325
[45] Date of Patent: Apr. 26, 1994

[54] ACCELEROMETER SENSOR NOISE REDUCTION METHOD AND MEANS

[75] Inventor: Donald J. Scheiber, Columbia City, Ind.

[73] Assignee: Magnavox Electronic Systems Company, Fort Wayne, Ind.

[21] Appl. No.: 936,998

[22] Filed: Aug. 31, 1992

[51] Int. Cl.⁵ .......................................... H04R 17/00
[52] U.S. Cl. .................... 367/178; 367/180; 367/154; 367/901; 181/122; 73/602
[58] Field of Search .............. 367/57, 178, 180, 911, 367/912, 901, 153, 154; 181/102, 122; 73/584, 602, 652, 152

[56] References Cited

U.S. PATENT DOCUMENTS

| | | | |
|---|---|---|---|
| 3,736,556 | 5/1973 | Barr, Jr. | 367/178 |
| 4,280,188 | 7/1981 | Weinstein et al. | 74/5.34 |
| 4,928,263 | 5/1990 | Armstrong et al. | 367/118 |
| 5,128,905 | 7/1992 | Arnott | 367/140 |

*Primary Examiner*—J. Woodrow Eldred
*Attorney, Agent, or Firm*—John H. Crozier; Richard T. Seeger

[57] ABSTRACT

In a preferred embodiment, an accelerometer sensor system, including: a housing structure; a first acceleration sensor disposed in the housing structure at a first selected location along the vertical axis of the housing structure, the first acceleration sensor providing a first output; a second acceleration sensor disposed in the housing structure at a second selected location along the vertical axis, the second acceleration sensor providing a second output; and apparatus to combine the first and second outputs of the first and second acceleration sensors such as to simulate the output from a virtual acceleration sensor located at any selected location on the vertical axis, allowing one to reduce noise induced by pitch motion, at any desired frequency or across a desired frequency band.

5 Claims, 1 Drawing Sheet

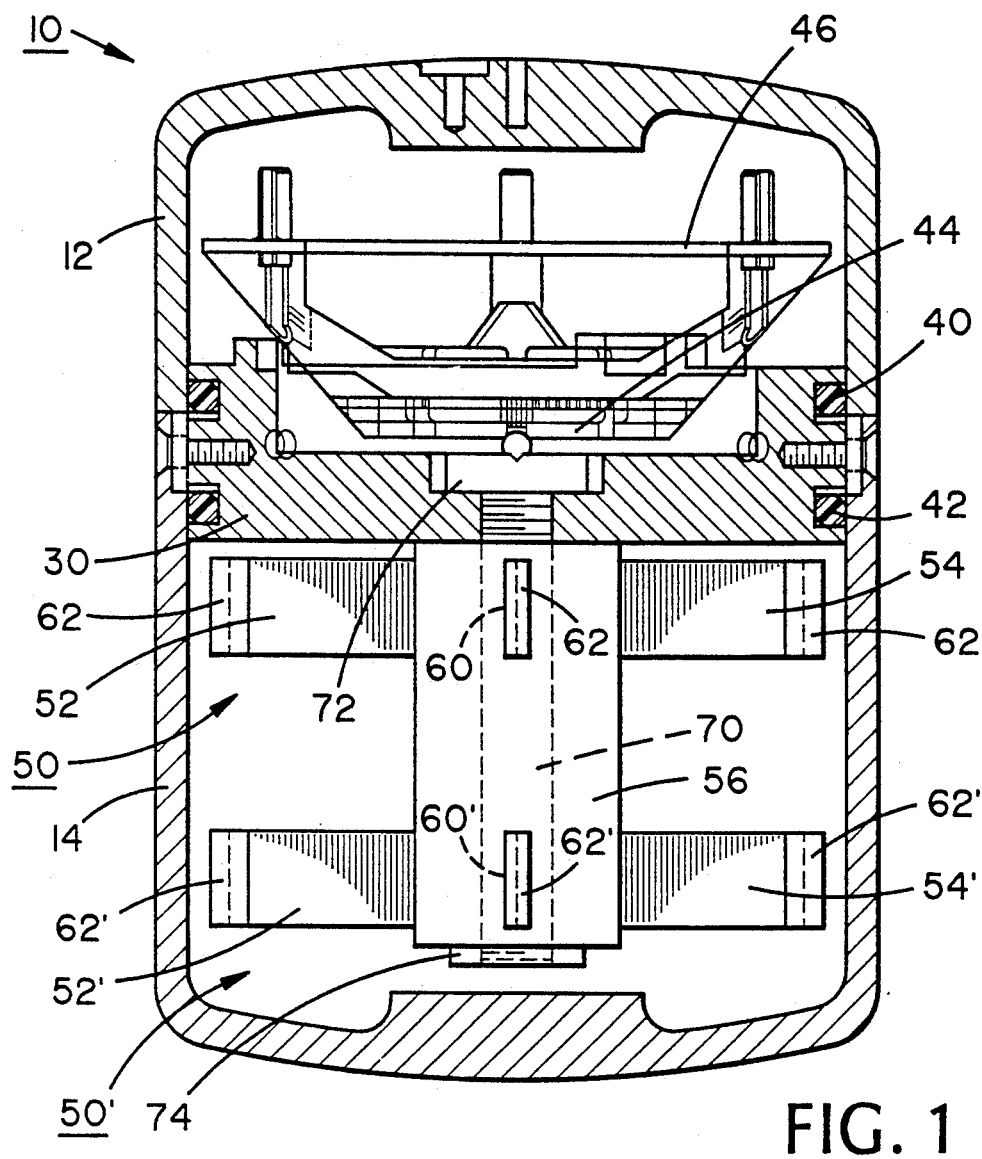
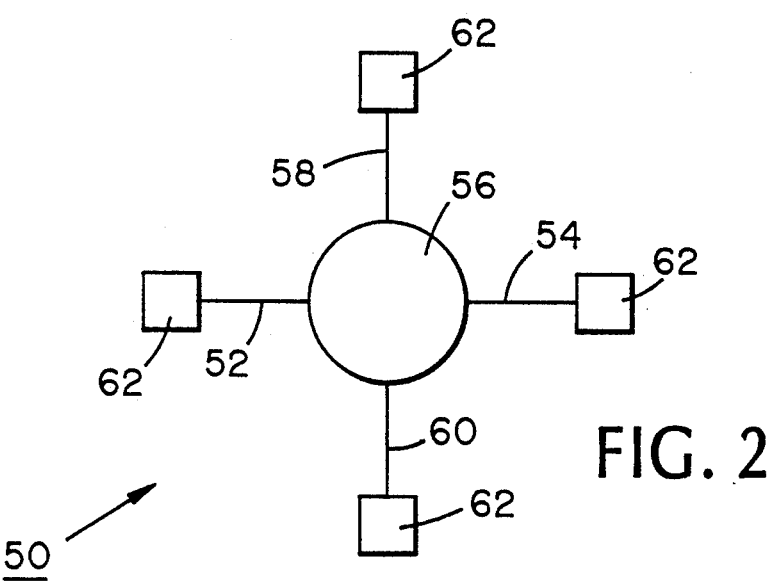

ACCELEROMETER SENSOR NOISE REDUCTION METHOD AND MEANS

BACKGROUND OF THE INVENTION

1. Field of the Invention

The present invention relates to accelerometers generally and, more particularly, but not by way of limitation, to a novel method and means for cancellation of accelerometer sensor noise due to dynamic pitch motion of the platform on which the sensor is mounted.

2. Background Art

A need has long existed for a method and means to reduce or eliminate flow noise and mechanically induced noise in directional hydrophones. This noise is predominant near the low end of the frequency range of interest (near 10 Hz), and generally increases in severity as the flow increases. The noise is due, in part, to mechanical vibrations induced by flow past various components of the system and, in part, to motion induced into the system due to surface waves. The directional sensor may be regarded as a very sensitive accelerometer which responds to these mechanical vibrations and perturbations. These vibrations are coupled to the sensor through the support cables and suspension components of the buoy system. The present invention relates to means by which the sensor's sensitivity to these motion induced vibrations can be reduced; however, it will be apparent to those skilled in the art that the invention may be readily applied to other types of accelerometer based sensors.

Many direction hydrophones, microphones or accelerometer sensors, operate basically as accelerometers whose main axis of sensitivity is in the horizontal plane. Such devices not only respond to the horizontal acceleration of the mounting platform due to the acoustic driving force (or acceleration of the platform on which the sensor is mounted), but also to other forces which accelerate the body in translational or rotational motion. Such an accelerometer based sensor will also respond to the component of gravity which acts along the sensitive axis of the device.

If the sensor platform is periodically tilted about a horizontal axis normal to the sensitive axis of the horizontal accelerometer, then the gravitational force component in the direction of the sensitive axis of the sensor will cause a periodic output from the sensor indistinguishable from the output caused by a periodic acceleration or from the output due to an acoustic excitation. This gravity induced output is one form of undesirable motion induced noise caused in this case by pitch motion about a horizontal axis.

There is also a component of acceleration in the output of the sensor caused by rotational accelerational effects as the sensor platform periodically tilts about a horizontal axis, the same motion described above. The amplitude of this acceleration component is given by the angular acceleration of the platform times the distance from the axis of rotation to the reaction mass of the sensor. At a singular position along the vertical axis of the sensor, these two noise sources cancel one another.

Accordingly, it is a principal object of the present invention to provide a method and means to reduce noise experienced by accelerometer sensors.

It is another object of the invention to provide such means that is easily and economically constructed.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among, others by providing, in a preferred embodiment, an accelerometer sensor system, comprising: a housing structure; a first acceleration sensor disposed in said housing structure at a first selected location along the vertical axis of said housing structure, said first acceleration sensor providing a first output; a second acceleration sensor disposed in said housing structure at a second selected location along said vertical axis, said second acceleration sensor providing a second output; and means to combine said first and second outputs of said first and second acceleration sensors such as to simulate the output from a virtual acceleration sensor located at any selected location on said vertical axis, allowing one to reduce noise induced by pitch motion, at any desired frequency or across a desired frequency band.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which:

FIG. 1 illustrates a sensor system constructed according to the present invention.

FIG. 2 is a fragmentary top plan view of a portion of the sensor system of FIG. 1.

DETAILED DESCRIPTION OF THE PREFERRED EMBODIMENTS

In copending U.S. patent application Ser. No. 07/918,743, filed Jul. 27, 1992, by Donald J. Scheiber, assigned to the assignee of the present invention, and titled ACCELEROMETER SENSOR NOISE REDUCTION METHOD AND MEANS, the disclosure of which is incorporated by reference hereinto, there is described method and means to discriminate against those noise components in the output of an accelerometer which are due to a periodic pitch motion about an axis of rotation. This is done by placing the mass centroid of the accelerometer sensor vertically displaced from the axis of rotation by a frequency dependent distance. At the proper location, the dynamic accelerations caused by the rotation are cancelled by gravitational effects which come into play as the sensor is tilted in the earth's gravitational field. The distance, "z", is equal to $g/\omega^2$, where "g" is the gravitational acceleration and $\omega$ is the angular velocity. The axis of rotation varies with frequency in a manner which depends upon the dynamic properties of the body containing the accelerometer, the manner of support, and the excitation mechanism.

In accordance with the present invention, the noise output components generated by dynamic periodic pitch about a horizontal axis (the periodic gravitational effect, and the angular acceleration effect) can be made to cancel one another over a limited range of frequencies, whose center value depends upon the location of the sensor along the vertical axis of the sensor platform. Specifically, the present invention relates to the use of two (or more) sensors, positioned at different locations on an axis perpendicular to the axis of rotation, whose outputs are electronically combined in a specific weighted manner so as to create a "virtual" sensor located at any specified point along the axis. The term "virtual" as used herein means that the output from a sensor system appears to behave as though it were generated by a sensor located in a position at which no sensor truly exists. This capability allows one to null the noise output at any desired frequency. One can then, for example, sweep the noise null from one frequency to the next to achieve an improved signal detection across a given frequency band. Alternatively, one can combine the output from two sensor through frequency dependent filters, so as to achieve an improved signal-to-noise ratio at all frequencies, simultaneously, over a broad frequency range. The mathematical relationship describing these capabilities is given below:

Let the output from a horizontally sensitive accelerometer located along a vertical axis at position $Z_1$ be called $O_1$. Let the output from a similar sensor at $Z_2$ be called $O_2$. To simulate the output, $O_{zv}$ from a (virtual) sensor located at any position $Z_v$, the outputs from the first two sensors are combined as follows:

$$O_{zv} = (1-r)O_1 + rO_2,$$

where $r = (Z_v - Z_1)/(Z_2 - Z_1)$.

To simulate the output from a sensor located between $Z_1$ and $Z_2$, then the ratio r is bounded between zero and unity. A sensor located midway between $Z_1$ and $Z_2$ may be simulated be setting $r = \frac{1}{2}$. As can be seen from the above equation, this is equivalent to adding the output from the two sensors and dividing the sum by 2 to maintain consistent amplitude. Similarly, the position of sensor $Z_v$ can be simulated anywhere between sensors $Z_1$ and $Z_2$ or even beyond either of those sensors by the weighted summing of the outputs therefrom.

The methodology for creating a broadband sensor (one possessing a virtual sensor whose output shows a motion induced noise minimum over a broad frequency range) consists of combining the outputs from the sensors at $Z_1$ and $Z_2$ in accordance with the above relationship, but allowing $Z_v$ to vary with frequency according to the relationship:

$Z_v = -g/\omega^2$, where $\omega$ is the angular frequency. The ratio r is now frequency dependent.

FIG. 1 illustrates an accelerometer sensor system, in this case a directional hydrophone system, generally indicated by the reference numeral 10, constructed according to the present invention. Sensor system 10 includes upper and lower housing members 12 and 14, respectively, joined at a bulkhead 30. Upper and lower housing members sealingly engage intermediate bulkhead 30 by means of 0-rings 40 and 42, respectively. Disposed in upper housing member 12 are an electronic compass 44 and an electronics board 46, both of conventional type for the application.

Disposed in lower housing member 14 a first sensor, generally indicated by the reference numeral 50, comprising a first pair of oppositely disposed piezoelectric elements 52 and 54 mounted on a vertical mounting block 56 and a second pair of oppositely disposed piezoelectric elements 58 and 60 (FIG. 3) mounted orthogonal to the first pair. Piezoelectric elements 52, 54, 58, and 60 have mass members 62 mounted at the periphery thereof. Mounting block 56 is attached to bulkhead 30 by a vertical threaded rod 70 having nuts 72 and 74 threaded, respectively, on the upper and lower ends thereof, such that piezoelectric elements 52, 54, 58, and 60 are rigidly attached to bulkhead 30. Also disposed in lower housing member 14 and mounted on mounting block 56 is a second sensor, generally indicated by the reference numeral 50', the elements of which are identical to the elements of sensor 50, but having been given primed reference numerals.

FIG. 2 illustrates the relative positions of first and second piezoelectric sensor pairs 52/54 and 58/60, respectively, such that the outputs of directivity are orthogonal, whereby:

$52 + 54 = X_{out}$, and $58 + 60 = Y_{out}$.

It will be understood that, in accordance with the above teaching of the present invention, sensor 50 may be located at position $Z_1$ along the vertical axis of directional hydrophone system 10, while sensor 50' may be located at position $Z_2$ along the vertical axis. The outputs of sensors 50 and 50' are then combined, as described above, to create a virtual sensor at position $Z_v$ along the vertical axis. Position $Z_v$ may be between sensors 50 and 50' or it may be along the vertical axis but beyond either of the sensors.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. An accelerometer sensor system, comprising:
   (a) a housing structure;
   (b) a first acceleration sensor disposed in said housing structure at a first selected location along the vertical axis of said housing structure, said first acceleration sensor providing a first output;
   (c) a second acceleration sensor disposed in said housing structure at a second selected location along said vertical axis, said second acceleration sensor providing a second output; and
   (d) means to combine said first and second outputs of said first and second acceleration sensors such as to simulate the output from a virtual acceleration sensor located at any selected location on said vertical axis.

2. An acceleration sensor system, as defined in claim 1, wherein the location of said virtual acceleration sensor on said vertical axis is between said first and second acceleration sensors.

3. An acceleration sensor system, as defined in claim 1, wherein the location of said virtual acceleration sensor on said vertical axis is beyond said first and second acceleration sensors.

4. An acceleration sensor system, as defined in claim 1, wherein said first and second acceleration sensors are disposed in a directional hydrophone.

5. A method of nulling noise at any given frequency in an acceleration sensor system, comprising:
(a) receiving a first output from a first sensor located at a selected position along a vertical axis of said sensor system;
(b) receiving a second output from a second sensor located at a selected position along said vertical axis; and
(c) combining said first and second outputs in a weighted manner so as to electrically tune the noise null to any desired frequency by simulating the output of a virtual sensor at a location on said vertical axis.

* * * * *